United States Patent [19]
Yamazaki et al.

[11] Patent Number: 5,497,255
[45] Date of Patent: Mar. 5, 1996

[54] SPACIAL LIGHT MODULATION DEVICE INCLUDING A PIXEL ELECTODE LAYER AND A METHOD FOR MANUFACTURING THE SAME

[75] Inventors: Tetsuhiro Yamazaki; Hiromitsu Takenaka, both of Yokohama; Yuichi Kuromizu, Yokosuka, all of Japan

[73] Assignee: Victor Company of Japan, Ltd., Yokohama, Japan

[21] Appl. No.: 330,589

[22] Filed: Oct. 28, 1994

[30] Foreign Application Priority Data

Oct. 30, 1993 [JP] Japan .................................. 5-294774
Nov. 30, 1993 [JP] Japan .................................. 5-326133

[51] Int. Cl.$^6$ .......................... G02F 1/135; G02F 1/1335
[52] U.S. Cl. ................................. 359/72; 359/71
[58] Field of Search ................... 359/72, 71, 74, 359/54, 87

[56] References Cited

U.S. PATENT DOCUMENTS

| | | | |
|---|---|---|---|
| H840 | 11/1990 | Efron et al. ............................. | 350/320 |
| 5,056,895 | 10/1991 | Kahn ....................................... | 359/71 |
| 5,076,670 | 12/1991 | Sayyah .................................... | 359/72 |
| 5,329,390 | 7/1994 | Fujiwara et al. ........................ | 359/67 |

OTHER PUBLICATIONS

SPIE, Sayyah et al, "Liquid–Crystal Devices and Materials", vol. 1455, San Jose, CA, Feb. 25–27, 1991.
J. Appl. Phys., Efron et al, "The silicon liquid–crystal light valve", 57(4), Feb. 15, 1985, pp. 1356–1368.

*Primary Examiner*—Anita Pellman Gross
*Assistant Examiner*—James A. Dudek
*Attorney, Agent, or Firm*—Jacobson, Price, Holman & Stern

[57] ABSTRACT

A spacial light modulation device is composed of a photoconductive layer, a pixel electrode layer, a dielectric reflection layer, and a liquid crystal layer all laminated in sequence between first and second drive electrode layers. The pixel electrode layer includes a plurality of pixel electrodes partitioned by an insulating substance layer and arranged at predetermined intervals. In particular, to obtain higher contrast and higher resolution of the modulated and reflected light by the device, the surface area of each of the pixel electrodes formed on the photoconductive layer side is determined smaller than that formed on the dielectric reflection layer side. That is, in the pixel electrode layer, a plurality of square-shaped pixel electrodes are arranged into a matrix pattern at predetermined intervals. Each of the square-shaped pixel electrode is composed of a Schottky contact portion in contact with the photoconductive layer and a pixel composing portion in contact with the dielectric reflection layer. The contact area of the Schottky contact portion with the photoconductive layer is determined smaller than the contact area of the pixel composing portion with the dielectric reflection layer. It is also preferable that a dielectric planarized layer is further formed between the pixel electrode layer and the dielectric reflection layer to planarize the surface of the dielectric reflection layer.

15 Claims, 6 Drawing Sheets

SPACIAL LIGHT MODULATION DEVICE INCLUDING A PIXEL ELECTRODE LAYER AND A METHOD FOR MANUFACTURING THE SAME

BACKGROUND OF THE INVENTION

1. Field of the Invention

The present invention relates to a spacial light modulation device and a method of manufacturing the same, and more specifically to a spacial light modulation device suitable for use as a light information processing device incorporated in a projection display unit or a light computer.

2. Description of the Prior Art

Conventionally, there have been known projection display units of various types. In particular, a reflection-type spacial light modulation device is disclosed in Japanese Published Unexamined (Kokai) Patent Application No. 3-192332, by which modulated and reflected light can be obtained by changing the status of a liquid crystal sealed on a dielectric reflection layer side, on the basis of a voltage applied to respective pixel electrodes interposed between a photoconductive layer and the dielectric reflection layer.

In more detail, as shown in FIG. 1, the spacial light modulation device is of laminated structure composed of a transparent drive electrode layer 1, a photoconductive layer 2, a pixel electrode layer 5 (in which a great number of pixel electrodes 4 are partitioned by an insulating substance layer 3 and arranged at a predetermined pitch), a dielectric reflection layer 6, a liquid crystal layer 7 (of a predetermined thickness determined by a spacer 12a, 12b), and a transparent drive electrode layer 8. In practice, the above-mentioned laminated structure is sandwiched between two transparent insulating (glass) substrates 9 and 10.

In the above-mentioned structure, under the condition that a rectangular wave voltage is applied between the two drive electrode layers 1 and 8 of the spacial light modulation device by a drive voltage supply 11 connected between the two transparent drive electrode layers 1 and 8, when write light FA is allowed to be incident upon the drive electrode layer 1, light information can be accumulated as charges in the respective pixel electrodes 4. On the other hand, when read light FB is allowed to be incident upon the drive electrode layer 8; reflected from the dielectric reflection layer 6; and further passed through the liquid crystal layer 7 as reflected light FC, since the read light FB incoming into the liquid crystal layer 7 is modulated by a voltage applied to the liquid crystal layer 7 through the dielectric reflection layer 6 on the basis of the charges accumulated in the respective pixel electrodes 4, it is possible to obtain modulated and reflected light outgoing from the drive electrode layer 8.

In the above-mentioned structure, the pixel electrodes 4 are arranged into a matrix pattern. In more detail, as shown in FIG. 2, a plurality of square-shaped pixel electrodes 4 each having a one-side length L1 are arranged at regular intervals of D1, that is, at a constant pitch P=(L1+D1) in two dimensional plane.

Further, since the modulation rate increases with increasing voltage applied to the respective pixel electrodes 4, it is possible to increase the image contrast of the reflected light FC. On the other hand, since the density of the reflected light FC at the respective pixels increases with decreasing pitch P (=L1+D1) between the respective pixel electrodes 4, it is possible to increase the resolution of the obtained image of the reflected light FC to that extent.

In the above-mentioned light modulation device, however, the voltage applicable to the respective pixel electrodes 4 is limited by energy barrier formed between the adjacent pixel electrodes 4, so that it is impossible to increase the applied voltage unconditionally.

In more detail, when the potential difference between the respective pixel electrodes 4 becomes higher than the energy barrier, the charges accumulated at the respective pixel electrodes 4 flow to the adjacent pixel electrodes 4 through the photoconductive layer 2 (on the side of Schottky contact surface), with the result that the resolution in unit of pixel of the modulated and reflected light FC deteriorates. Accordingly, it is necessary to reduce the voltage applied to the respective pixel electrodes 4 below the above-mentioned energy barrier.

On the other hand, when the carrier concentration of the photoconductive layer 2 is assumed to be constant, since the strength of the above-mentioned energy barrier is dependent upon the intervals D1 between the two adjacent pixel electrodes 4, it is possible to increase the energy barrier by increasing the intervals D1. Therefore, when the intervals D1 is increased, a high voltage can be applied to the pixel electrodes 4, so that the image contrast can be increased without deteriorating the resolution in unit of pixel.

In this case, however, when only the pitch P is increased while keeping the one-side length L1 of the pixel electrode 4 at a constant value, the number of the pixels must be reduced as a whole. In addition, since the aperture ratio (the opening ratio in area of the pixel electrodes 4 to the pixel electrode layer 5) is reduced at the modulation portion, the pixel density and the resultant resolution of the device itself both inevitably deteriorate.

In contrast with this, when the one-side length L1 of the respective pixel electrodes 4 is reduced to increase the intervals D1 (between the two opposing side surfaces of the pixel electrodes 4) without changing the arrangement pitch P of the pixel electrodes 4, since the junction area between the respective pixel electrodes 4 and the dielectric reflection layer 6 decreases, the aperture ratio at the modulation element area is inevitably reduced, so that the image contrast and the quantity of the modulated and reflected light FC are both lowered.

In other words, with respect to the improvement of the spacial light modulation device, there exists a contradictory relationship among the contrast, the aperture ratio and the resolution, so that it has been difficult to allow these conditions to be compatible, in particular in the case of the spacial light modulation device in which the pixel electrodes 4 are arranged at a pitch P on the order of 10 μm.

In addition, the prior art spacial light modulation device as shown in FIG. 1 involves the other following problems: To form the pixel electrode layer 5, it is necessary to form an insulating layer on the photoconductive layer 2 and then to apply a photoresist thereon. Further, the insulating layer is etched with the use of the photoresist as a mask to form a plurality of apertures.

Further, after etching, a metal film is formed on all the surface of the photoresist remaining on the insulating layer and the surfaces of the apertures, and then only the metal formed on the side surfaces of the remaining photoresist is etched in accordance with lift-off method to remove the photoresist and the metal formed on the surface of the photoresist. As a result, the metal can be buried in the apertures formed in the insulating layer as the pixel electrodes 4.

In the above-mentioned process, the lift-off method is adopted to form the pixel electrode layer 5. Therefore, in the etching process thereof, there exists a tendency that the sides of the apertures are easily etched, irrespective of dry etching or wet etching. As a result, as shown in FIG. 3, a V-shaped groove 15 is formed between the pixel electrode 4 and the insulating substance layer 3 respectively by the side etching, so that the dielectric reflection layer 6 (a multilayer formed on the surface of the pixel electrode layer 5) is also formed into a V-shape groove 16 along the groove 15.

In other words, since a number of grooves 16 are formed on the surface of the dielectric reflection layer 6 and thereby the surface of the layer 6 is not flat, whenever the read light FB is allowed to be incident upon the dielectric reflection layer 6, the incident angles thereupon differ and therefore become abnormal at the respective grooves 16.

On the other hand, the dielectric reflection layer 6 is provided with such a function that the reflection factor is enhanced on the basis of interference of the light FC reflected from the respective interfaces of the multilayer films of the dielectric reflection layer 6. Further, the reflection factor of the dielectric reflection layer 6 is determined on the basis of the relationship between the wavelength of the read light FB and the film thickness in the direction that the read light FB transmits.

As a result, when a number of the grooves 16 are formed on the surface of the dielectric reflection layer 6 as described above, the reflection factor of the dielectric reflection layer 6 is reduced below the value designed on the assumption that the dielectric reflection layer 6 is flat. In addition, since the light scattering phenomenon is produced at the respective grooves 16, the brightness of the image due to the reflection light FC is lowered markedly.

Further, since a defectiveness (e.g., pinholes) is easily produced at the respective grooves 16 during the process of forming the dielectric reflection layer 6, the read light FB is reflected toward the horizontal direction of the surface of the dielectric reflection layer 6 or the vertical direction of the surface of the pixel electrodes 4 as shown by thin arrows in FIG. 3, with the result that the resolution of the image obtained on the basis of the reflected light FC deteriorates. In particular, since the reduction of the reflection factor at the respective grooves 16 conversely causes an increase of the transmission of the read light FB through the dielectric reflection layer 6, when the V-shaped grooves 15 formed at the peripheries of the pixel electrodes 4 are deep enough to reach the photoconductive layer 2, the read light FB leaks toward the photoconductive layer 2. In this case, since the charges are accumulated in the pixel electrodes 4 by the photoelectric transfer of both the write light FA and the leaked read light FB, when the liquid crystal layer 7 is light modulated by the charge thus accumulated, the image contrast is lowered markedly and further the light modulation is disabled at the worst.

On the other hand, if the anisotropic etching method is adopted in the process of forming the pixel electrode layer 5 in accordance with the lift-off method, it may be possible to prevent the side etching. In this method, however, since a reactive ion etching is required, there exists another problem in that the surface of the photoconductive semiconductor layer 2 is damaged due to ion impulses. Further, when defectiveness and impurities exist on the Schottky contact surface, since the diode characteristics deteriorate, it is rather difficult to adopt the anisotropic etching method.

SUMMARY OF THE INVENTION

With these problems in mind, therefore, it is the object of the present invention to provide a spacial light modulation device provided with both high contrast and high resolution and the method of manufacturing the same.

Further, the other object of the present invention is to provide a spacial light modulation device of high reflection factor to the read light.

To achieve the above-mentioned object, the present invention provides a spacial light modulation device in which a photoconductive layer, a pixel electrode layer, a dielectric reflection layer, and a liquid crystal layer are laminated in sequence between first and second drive electrode layers, wherein the pixel electrode layer includes a plurality of pixel electrodes partitioned by an insulating substance layer and arranged at predetermined intervals; and a surface area of each of the pixel electrodes formed on the photoconductive layer side is smaller than that formed on the dielectric reflection layer side.

Further, a plurality of square-shaped pixel electrodes are formed in the pixel electrode layer being arranged into a matrix pattern at predetermined intervals; and each of the square-shaped pixel electrode is composed of a Schottky contact portion in contact with the photoconductive layer and a pixel composing portion in contact with the dielectric reflection layer, the contact area of the Schottky contact portion with the photoconductive layer being smaller than the contact area of the pixel composing portion with the dielectric reflection layer.

The spacial light modulation device further comprises a dielectric planarized layer formed between the pixel electrode-layer and the dielectric reflection layer to planarize a surface of the dielectric reflection layer.

Further, the present invention provides a spacial light modulation device in which a photoconductive layer, a pixel electrode layer having a plurality of pixel electrodes arranged at predetermined intervals, a dielectric reflection layer, and a liquid crystal layer are laminated in sequence between first and second drive electrode layers, which further comprises a dielectric planarized layer formed between the pixel electrode layer and the dielectric reflection layer to planarize a surface of the dielectric reflection layer.

Further, in the spacial light modulation device, a surface area of each of the pixel electrodes formed on the photoconductive layer side is smaller than that formed on the dielectric reflection layer side. Further, in the pixel electrode layer, a plurality of square-shaped pixel electrodes are arranged into a matrix pattern at predetermined intervals; and each of the square-shaped pixel electrode is composed of a Schottky contact portion in contact with the photoconductive layer and a pixel composing portion in contact with the dielectric reflection layer, the contact area of the Schottky contact portion with the photoconductive layer being smaller than the contact area of the pixel composing portion with the dielectric reflection layer.

Further, the present invention provides a method of manufacturing a spacial light modulation device having a photoconductive layer, a pixel electrode layer, a dielectric reflection layer, and a liquid crystal layer all laminated in sequence between first and second drive electrode layers, which comprises the steps of: forming a first silicon nitride layer on a surface of the photoconductive layer by vapor deposition; forming a plurality of first square-shaped aperture portions each having a first one-side length on a surface of the formed first silicon nitride layer at predetermined intervals by light exposure; forming a metal film on the surface of the first silicon nitride in which a plurality of the first square-shaped aperture portions are formed, and after planarization forming each Schottky contact portion at each of a plurality of the first square-shaped aperture portions; forming a second silicon nitride layer on the surface of the first silicon nitride layer in which the Schottky contact portions are formed by vapor deposition; forming a plurality of second square-shaped aperture portions each having a second one-side length longer than the first one-side length on each first square-shaped aperture portion in which the Schottky contact portion is formed, in concentric positional relationship between the first and second square-shaped portions by light exposure of the second silicon nitride layer; and forming a metal film on the second silicon nitride layer in which the second square-shaped aperture portions are formed, and after planarization forming each pixel composing portion in the second square-shaped aperture portion, to form a plurality of pixel electrodes composed of Schottky contact portions and pixel composing portions in the pixel electrode layer.

Further, the method of manufacturing a spacial light modulation device further comprises the steps of: forming an application-type silicon compound film on a surface of the pixel electrode layer in which a plurality of the pixel electrodes are formed; and forming a planarized layer between the pixel electrode layer and the dielectric reflection layer by annealing the applied film.

Further, the present invention provides a method of manufacturing a spacial light modulation device in which a photoconductive layer, a pixel electrode layer having a plurality of pixel electrodes arranged at predetermined intervals, a dielectric reflection layer, and a liquid crystal layer are laminated in sequence between first and second drive electrode layers, which comprises the steps of: forming an application-type silicon compound film on a surface of the pixel electrode layer in which a plurality of the pixel electrodes are formed; and forming a planarized layer between the pixel electrode layer and the dielectric reflection layer by annealing the applied film.

Further, the method of manufacturing a spacial light modulation device further comprises the steps of: forming a first silicon nitride layer on a surface of the photoconductive layer by vapor deposition; forming a plurality of first square-shaped aperture portions each having a first one-side length on a surface of the formed first silicon nitride layer at predetermined intervals by light exposure; forming a metal film on the surface of the first silicon nitride in which a plurality of the first square-shaped aperture portions are formed, and after planarization forming each Schottky contact portion at each of a plurality of the first square-shaped aperture portions; forming a second silicon nitride layer on the surface of the first silicon nitride layer in which the Schottky contact portions are formed by vapor deposition; forming a plurality of second square-shaped aperture portions each having a second one-side length longer than the first one-side length on each first square-shaped aperture portion in which the Schottky contact portion is formed, in concentric positional relationship between the first and second square-shaped portions by light exposure of the second silicon nitride layer; and forming a metal film on the second silicon nitride layer in which the second square-shaped aperture portions are formed, and after planarization forming each pixel composing portion in the second square-shaped aperture portion, to form a plurality of pixel electrodes composed of Schottky contact portions and pixel composing portions in the pixel electrode layer.

DETAILED DESCRIPTION OF THE EMBODIMENTS

Figure 1:
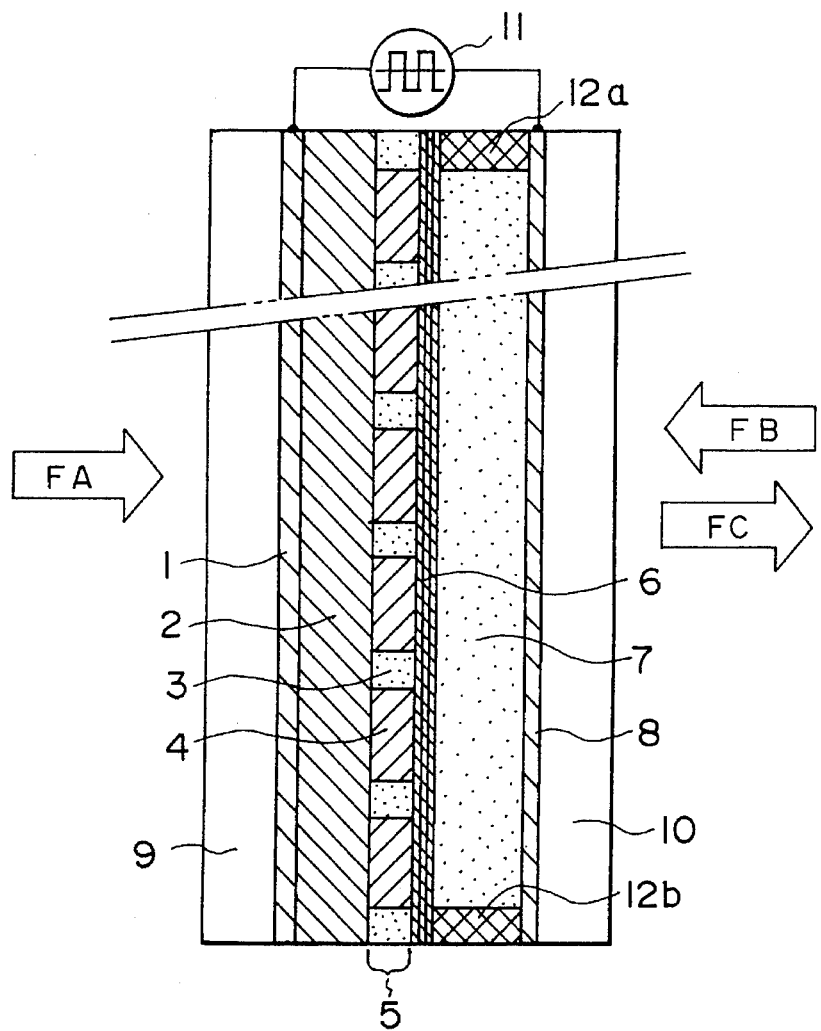
FIG. 1 is a cross-sectional view showing the structure of a prior art spacial light modulation device.
Figure 4:
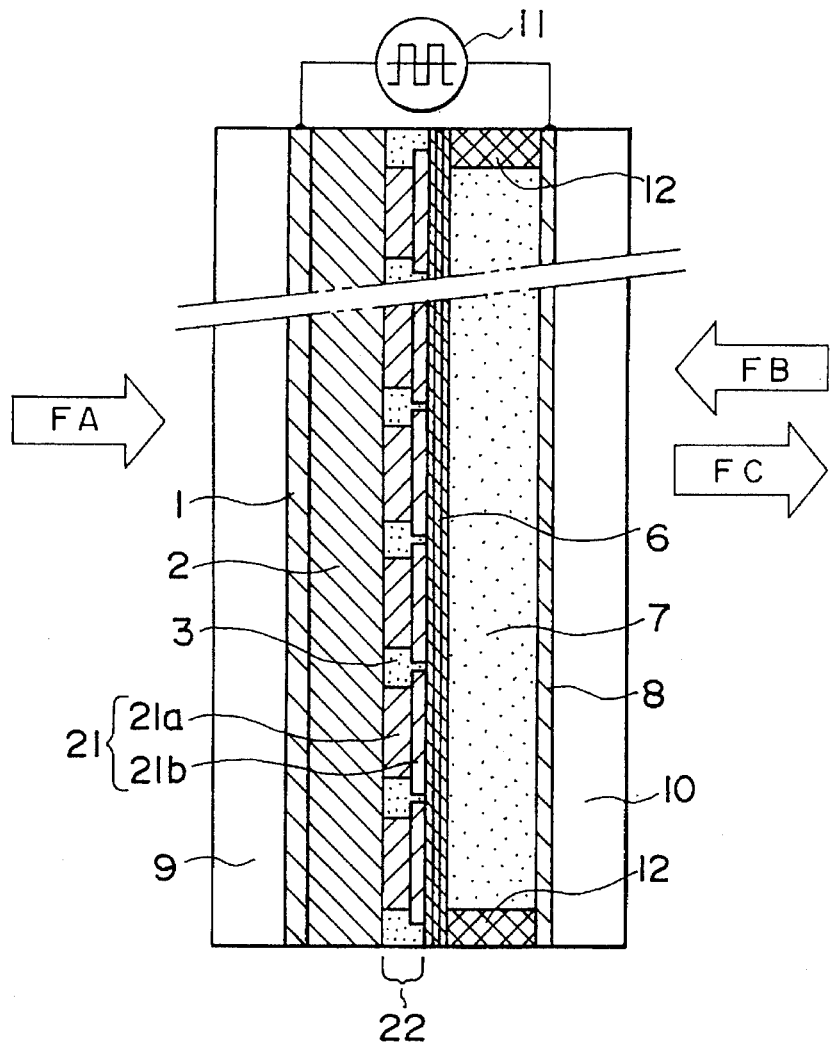
FIG. 4 is a cross-sectional view showing the structure of a first embodiment of the spacial light modulation device according to the present invention.

FIG. 4 is a cross-sectional view showing a first embodiment of the spacial light modulation device according to the present invention, in which the same reference numerals have been retained for the similar elements which have the same functions as with the case of the prior art device shown in FIG. 1.

As shown in FIG. 4, the special light modulation device is of laminated structure body composed of a drive electrode layer 1, a photoconductive layer 2, a pixel electrode layer 22, a dielectric reflection layer 6, a liquid crystal layer 7, and a transparent drive electrode layer 8. In the pixel electrode layer 22, a number of pixel electrodes 21 are partitioned by an insulating substance layer 3 and arranged at a predetermined pitch. Further, in practice, the laminated structure body is sandwiched between two transparent insulating (e.g., glass) substrates 9 and 10 in use.

Here, the drive electrode layer 1 can be formed by a transparent electrode layer or by an N-type low resistance layer formed on one side surface of a high resistance N-type Si layer used as the photoconductive layer 2. Further, in the pixel electrode layer 22, pixel electrodes 21 formed of a conductive metal (e.g., platinum) are partitioned by an insulating substance (e.g., silicon nitride) layer 3 and further arranged into a matrix pattern.

On the other hand, the liquid crystal layer 7 is formed by sealing a liquid crystal between the dielectric reflection layer 6 and the drive electrode layer 8 with a predetermined thickness by use of a spacer 12.

Here, the operation of the spacial light modulation device as described above will be explained hereinbelow. First, a rectangular waveform voltage is applied by a drive voltage supply 11 between the two drive electrode layers 1 and 8. In this voltage application, when a negative voltage is applied to the drive electrode layer 8, since the contact surface (Schottky contact surface) between the pixel electrodes 21 and the photoconductive layer 2 of high resistance N-type Si layer is biased in the reverse direction, a depletion layer spreads in the photoconductive layer 2 on the side of and in the vicinity of the pixel electrode 21.

Under these conditions, when write light FA is allowed to be incident upon the device through the transparent insulating substrate 9, electrons and holes are generated in the depletion layer and the generated holes are moved to the side of the pixel electrodes 21 due to the electric field applied to the depletion layer and then accumulated in the pixel electrodes 21.

As a result, the holes accumulated in the pixel electrode 21 raises the voltage applied from the pixel electrodes 21 (upon which the write light FA is allowed to be incident) to the liquid crystal layer 7 via the dielectric reflection layer 6.

On the other hand, when a positive voltage is applied to the drive electrode layer 8, since the Schottky contact surface between the pixel electrodes 21 and the photoconductive layer 2 is biased in the forward direction, the accumulated holes are all emitted, so that the voltage of the drive voltage supply 11 is applied on an average to the overall surface of the liquid crystal layer 7 via the dielectric reflection layer 6.

Therefore, under the dark conditions (where the write light FA is not allowed to be incident), as far as the rectangular waveform voltage of the drive voltage supply 11 is so determined that the negative voltage applied to the liquid crystal layer 7 is slightly lower than the threshold voltage at which double refraction (birefringence) is produced in the liquid crystal cells and in addition that the time during which the positive voltage is applied is set to such a short time not enough to produce the double refraction in the liquid crystal cells, the polarization direction of the reflected light FC of the read light FB can be changed at only the pixel electrode (21) regions to which the write light FA incomes, with the result that it is possible to modulate the reflected light FC on the basis of the write light FA.

Figure 5:
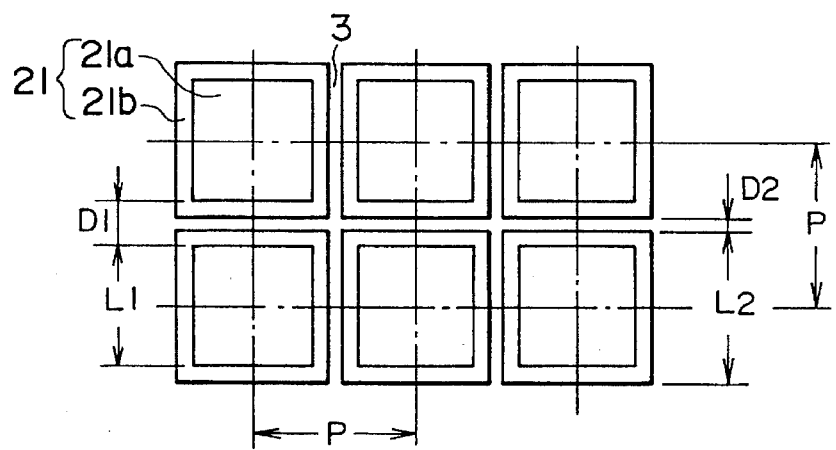
FIG. 5 is a plane view showing the arrangement of the pixel electrodes of the spacial light modulation device shown in FIG. 4.

The features of the spacial light modulation device according to the present invention are that the respective pixel electrodes 21 of the pixel electrode layer 22 are each composed of a Schottky contact portion 21a and a pixel composing portion 21b and that the contact area between the pixel composing portion 21b and the dielectric reflection layer 6 is determined larger than the contact area between the Schottky contact portion 21a and the photoconductive layer 2. In more detail, as shown in FIG. 5 (which is a plane view showing the arrangement of the respective pixel electrodes 21), the Schottky contact portions 21a in contact with the photoconductive layer 2 are formed into the same square shape (having one side length of L1) as with the case of the prior art pixel electrodes 4 (shown in FIG. 2). However, the pixel composing portions 21b in contact with the dielectric reflection layer 6 are formed into another square shape (having one side length of L2> L1) larger than the Schottky contact portions 21a. Here, since the arrangement pitch P of the respective pixel electrodes 21 are the same as with the case of the prior art shown in FIG. 2, the intervals D2 of the respective pixel composing portions 21b is smaller than the prior art intervals D1. Further, the thickness of the respective electrodes 21 is the same as with the case of the prior art pixel electrodes 4 shown in FIGS. 1 and 2.

Accordingly, in the spacial light modulation device according to the present invention, in spite of the fact that the arrangement pitch P of the pixel electrodes 21 is the same as the pitch of the prior art pixel electrodes 4 (shown in FIG. 2), it is possible to increase the plane shape area of the pixel composing portions 21b. Further, since the intervals 01 of the Schottky contact portions 21a do not change, the energy barrier between the respective pixel electrodes 21 can be determined to be the same as with the case of the prior art pixel electrodes shown in FIGS. 1 and 2.

Figure 2:
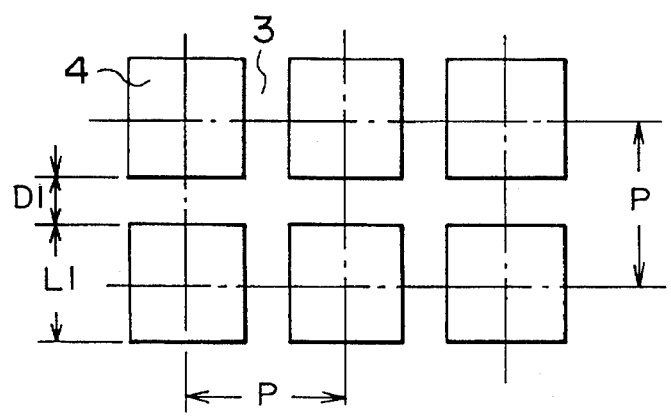
FIG. 2 is a plane view showing the arrangement of the pixel electrodes of the spacial light modulation device shown in FIG. 1.
Figure 3:
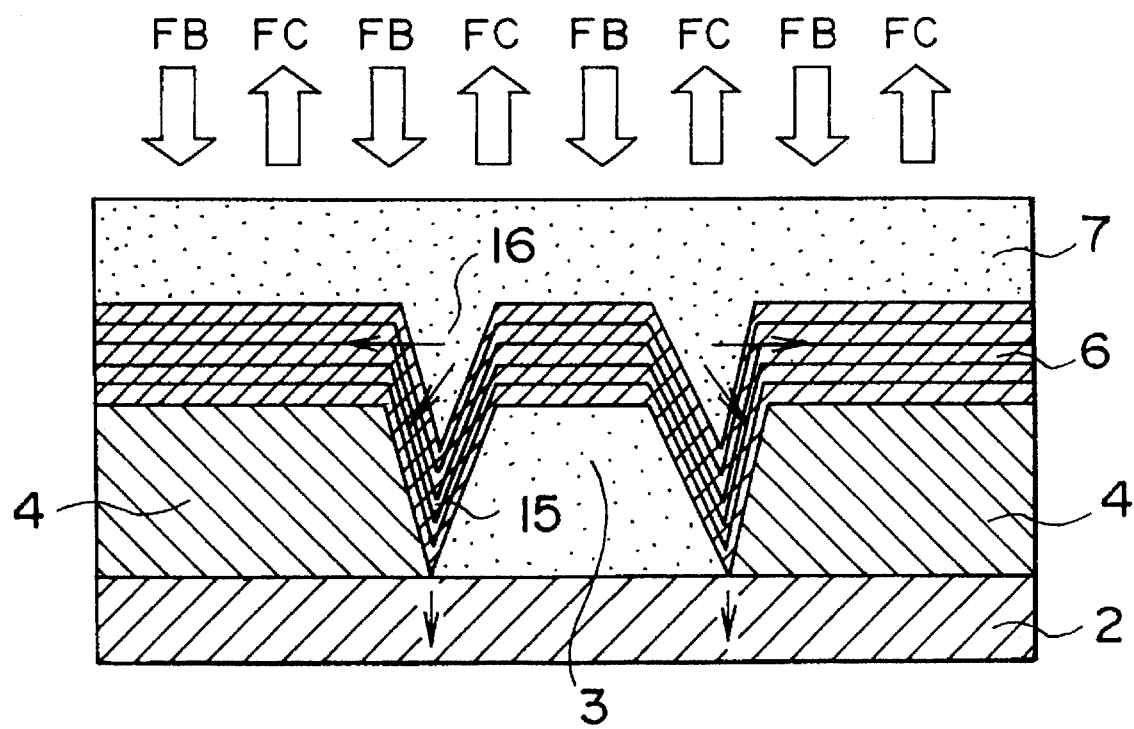
FIG. 3 is an enlarged cross-sectional view showing the contact portions between the pixel electrodes and the insulating layer in the prior art spacial light modulation device shown in FIG. 1.

Therefore, for comparison, where the arrangement pitch P is 10 μm in both the prior art pixel electrodes 4 and the invention pixel electrodes 21; the one-side length L1 is 7 μm and the intervals D1 is 3 μm in the prior art pixel electrodes 4 shown in FIGS. 1 and 2; and the one-side length L2 is 9 μm and the intervals D2 is 1 μm in the pixel composing portions 21b of the pixel electrodes 21 of the invention device, for instance, it is possible to realize an aperture ratio as large as about 81% in the case of the invention device, without changing the energy barrier, as compared with the prior art aperture ratio of 49%.

As a result, in the device according to the present invention, since the energy barrier is kept high between the respective pixel electrodes 21 in spite of the larger aperture ratio, a higher voltage can be applied by the drive voltage supply 11, so that it is possible to obtain the spacial light modulation high in both contrast and pixel density, without deteriorating the resolution in unit of pixel. Further, the above-mentioned effect increases with decreasing arrangement pitch P of the pixel electrodes 21.

Further, the ratio in thickness of the SGhottky contact portions 21a to the pixel composing portions 21b can be determined freely in any range as far as the layer of the insulating substance layer 3 can be formed stably between the pixel composing portions 21b and the photoconductive layer 2 during the manufacturing process of the device.

A first method of manufacturing the device according to the present invention will be described hereinbelow with reference to FIGS. 6A to 6G.

Figure 6A:
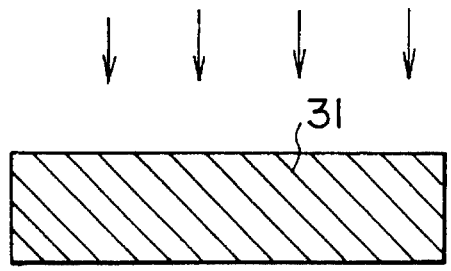
FIGS. 6A to 6G are cross-sectional views for assistance in explaining the process of manufacturing the photoconductive layer of the spacial light modulation layer shown in FIG. 4.
Figure 6B:
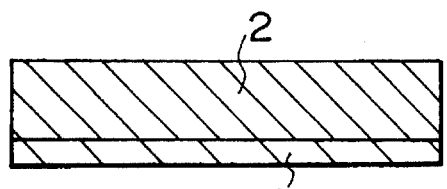

First, as shown in FIG. 6A, N-type impurities such as phosphorus (P) or arsenic (As) ions are implanted on one surface of a high resistance N-type mono-crystal Si substrate (300 ohm-cm or more) 31, as shown by arrows, to form a high concentration layer, so that the drive electrode layer 1 of N-type low resistance layer and the photoconductive layer 2 of N-type high resistance Si layer can be formed on both surfaces of the substrate, as shown in FIG. 6B.

Figure 6C:
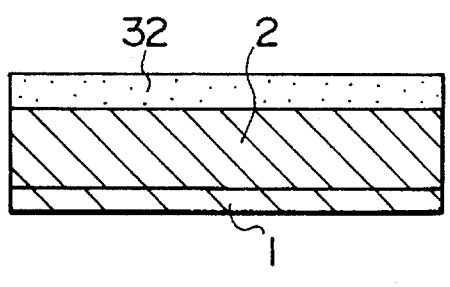

Further, as shown in FIG. 6C, the photoconductive layer 2 is mirror-polished to a predetermined thickness, and after that, a silicon nitride layer 32 is formed on the polished surface by depositing silicon nitride $Si_3N_4$ in accordance with plasma CVD (chemical Vapor Deposition) method. Further, this silicon nitride layer 32 is formed so as to have a thickness corresponding to that of the Schottky contact portion 21a.

Figure 6D:
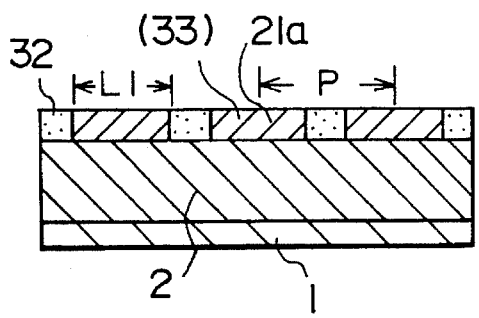

Here, as shown in FIG. 6D, square-shaped aperture portions 33 having one side length of L1 are formed at a pitch P on the silicon nitride layer 32 in accordance with photolithography method. After platinum (Pt) film has been formed all over the surface thereof by sputtering method, the surface thereof is planarized by lift-off method to form the Schottky contract portions 21a at the aperture portions 33.

Further, after that, the substrate is annealed at about 400° to 500° C. for improvement of the rectifying characteristics of the Schottky contact portions 21a.

Figure 6E:
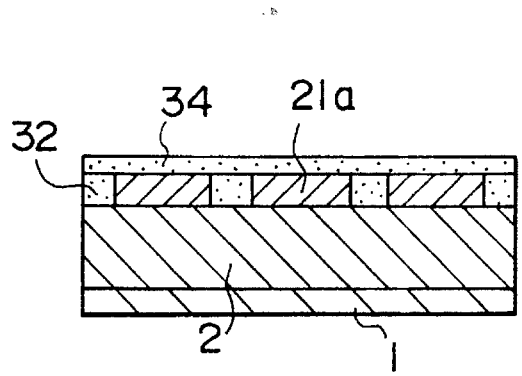
Figure 6F:
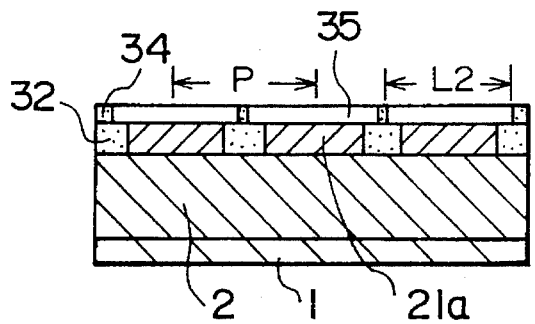

Further, as shown in FIG. 6E, silicon nitride is deposited on the surface of the silicon nitride layer 32 and the Schottky contact portions 21a by the plasma CVD method again to form a silicon nitride layer 34. Further, as shown in FIG. 6F, square-shaped aperture portions 35 having one side length of L2 are formed at a pitch P at such concentric positions as to correspond to the Schottky contact portions 21a by photolithography method. Further, this silicon nitride layer 34 is formed so as to have a thickness corresponding to that of the pixel composing portion 21b.

Figure 6G:
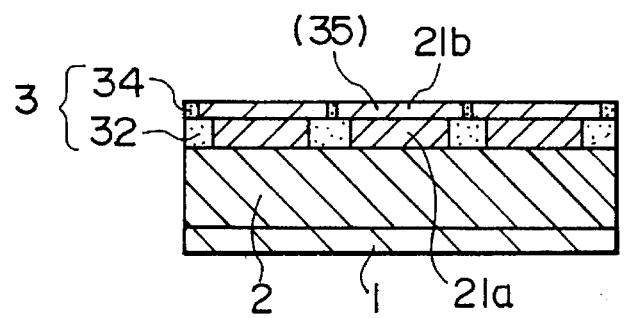

Further, as shown in FIG. 6G, after platinum (Pt) film has been formed all over the surface thereof by sputtering method, the surface thereof is planarized by lift-off method to form the pixel composing portions 21b at the aperture portions 35.

In this case, however, it is not necessary to form this metal film by the same metal (Pt) as that of the Schottky contact portions 21a. That is, any metal can be used as far as a high planarization can be achieved at the film forming stage.

As a result of the above-mentioned manufacturing process, the pixel electrodes 21 composed of the Schottky contact portions 21a and the pixel composing portions 21b are formed under such conditions as to be partitioned and buried in the insulating substance layer 3 composed of the silicon nitride layers 32 and 34, so that a multilayer structure composed of the drive electrode layer 1, the photoconductive layer 2 and the pixel electrode layer 21 can be constructed.

After that, a dielectric film is formed on the surface (in which the pixel composing portions 21b of the pixel electrodes 21 are exposed) by the plasma CVD method. After having been annealed, the dielectric reflection layer 6 is formed by forming a number of reflection films. Further, the liquid crystal layer 7 is sealed between the dielectric reflection layer 6 and the drive electrode layer 8 by determining the thickness thereof by use of a spacer 12. Further, two transparent insulating substrates 9 and 10 are bonded on both the surfaces of the two drive electrode layers 1 and 8, respectively to complete the device of the present embodiment as shown in FIG. 4. Here, as the liquid crystal layer 7, the liquid crystal substance of positive anisotropic 45-degree torsional nematic state or vertical orientation can be used.

As described above, in the first embodiment according to the present invention, since the contact surface between the respective pixel electrodes 21 and the dielectric reflection layer 6 is determined larger than that between the respective pixel electrodes 21 and the photoconductive layer 2, it is possible to increase the aperture ratio on the basis of which the reflection light of the read light can be modulated, while maintaining a large energy barrier between the respective pixel electrodes 21, with the result that it is possible to apply a high drive voltage for realization of both high contrast and high resolution in the image obtained by the spacial light modulation device.

In other words, the higher pixel density and the higher modulated image quality are both compatible with each other.

Further, in the conventional spacial light modulation device, when platinum (Pt) is used as the pixel electrode material, it has been necessary to improve the rectifying characteristics by annealing the device at about 400° to 500° C. In this annealing process, there exists a problem in that the electrode surface is roughed so that the reflection factor at the dielectric reflection layer is lowered. In the device of the present invention, however, since the pixel electrodes 21 can be formed being divided into the Schottky contact portions 21a and the pixel composing portions 21b, it is possible to anneal only the Schottky contact portions 21a or to form the pixel composing portions 21b of different electrode material, with the result that there exists such an advantage that the problem involved in the conventional device can be solved.

Figure 7:
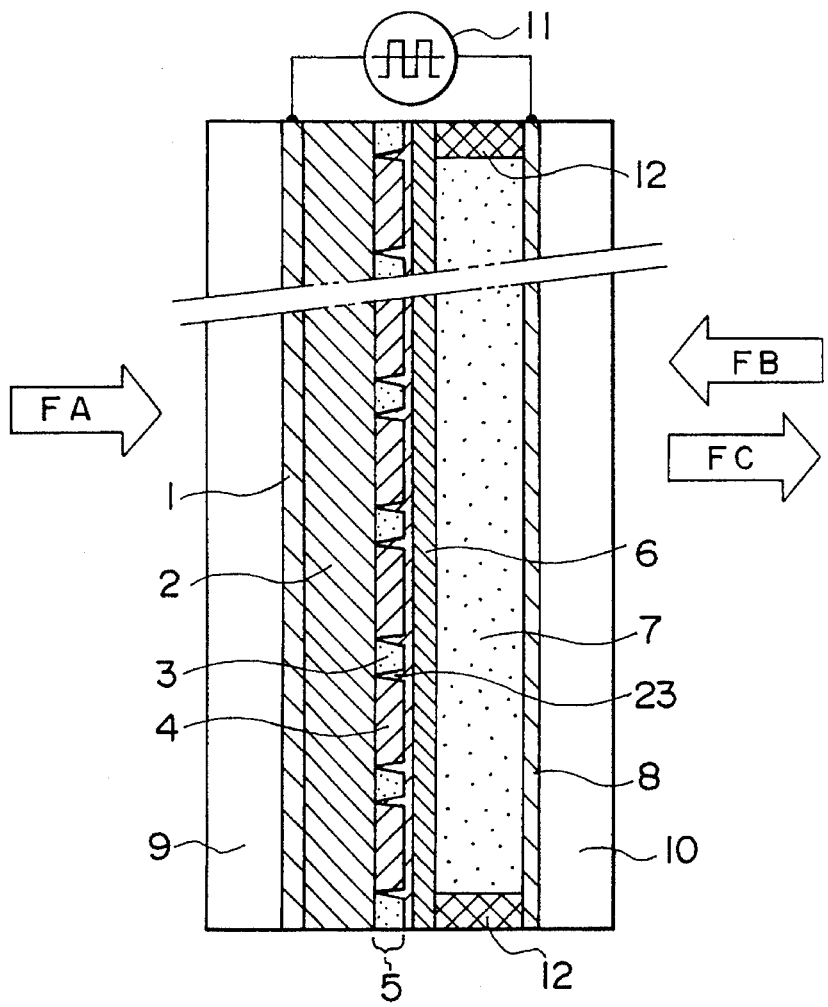
FIG. 7 is a cross-sectional view showing the structure of a second embodiment of the spacial light modulation device according to the present invention.

FIG. 7 is a cross-sectional view showing a second embodiment of the spacial light modulation device according to the present invention, in which the same reference numerals have been retained for similar elements which have the same functions as with the case of the prior art device shown in FIG. 1.

The feature of this second embodiment is that a planarized layer 23 is interposed between the pixel electrode 5 and the dielectric reflection layer 6. This planarized layer 23 can planarize the surface of the pixel electrode layer 5 on the side of the dielectric reflection layer 6 by forming a perfectly planarized thin dielectric film surface between the respective pixel electrodes 4 and the dielectric reflection layer 6.

Figure 8:
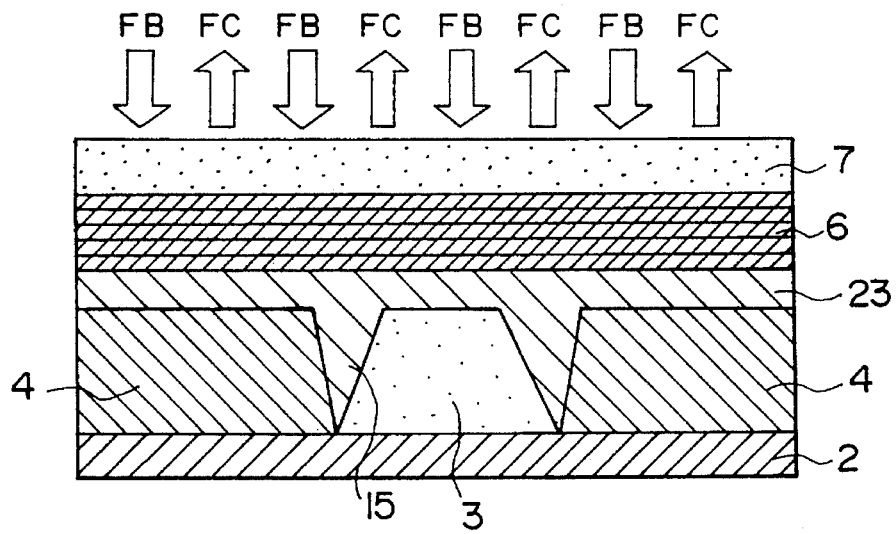
FIG. 8 is an enlarged cross-sectional view showing the contact portions between the pixel electrodes and the insulating layer in the spacial light modulation device shown in FIG. 7.

FIG. 8 is an enlarged view showing the adjoining portions between the respective pixel electrodes 4 and the insulating substance layer 3 on which the planarized layer 23 is additionally formed. In the case shown in FIG. 8, since the dielectric reflection layer 6 forms a perfect reflecting surface on the side of the liquid crystal layer 7, the reflection factor and the resolution both do not deteriorate. Further, since the dielectric reflection layer 6 and the photoconductive layer 2 are separated from each other perfectly by the presence of the planarized layer 23, it is possible to prevent the read light FB from leaking toward the photoconductive layer 2, that is, to prevent the reduction of the image contrast.

Further, in the second embodiment, since the construction and the operation other than the above are substantially the same as with the case of the first embodiment, the detailed description thereof is omitted herein.

The method of manufacturing the second embodiment will be described hereinbelow with reference to FIGS. 9A to 9G. Further, since the manufacturing method of forming the drive electrode layer 1, the photoconductive layer 2, and the silicon nitride layer 32 are the same as with the case of the first embodiment shown in FIGS. 6A to 6C, so that the same description thereof is omitted herein.

Figure 9A:
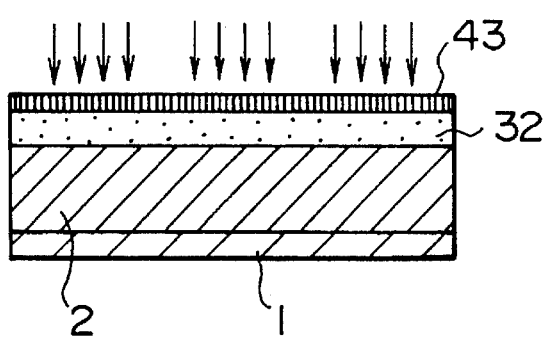
FIGS. 9A to 9G are cross-sectional views for assistance in explaining the process of manufacturing the spacial light modulation layer shown in FIG. 7.
Figure 9B:
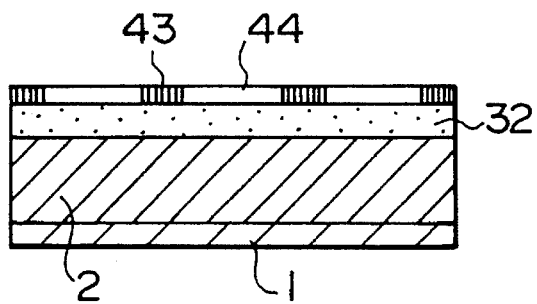

On the surface of the silicon nitride layer 32 formed as explained with reference to FIG. 6C, a photoresist 43 is formed as shown in FIG. 9A. After having been prebaked, the photoresist 43 is exposed to light with the use of a photo-mask (in which an arrangement pattern of the pixel electrodes 4 are formed) to transcribe the arrangement pattern onto the photoresist 43. After that, the photoresist 43 is developed with an organic solvent to remove the exposed regions so that the aperture portions 44 can be formed at the corresponding positions of the respective pixel electrodes 4.

Figure 9C:
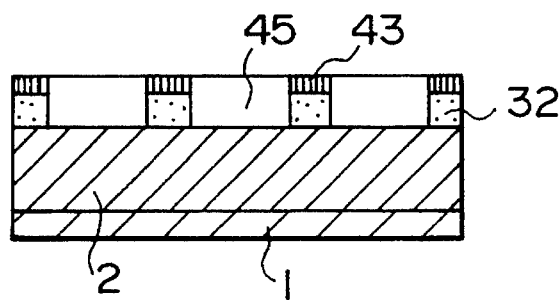

Further, as shown in FIG. 9C, the silicon nitride layer 32 is etched with the photoresist 43 as a mask to form the aperture portions 35.

Figure 9D:
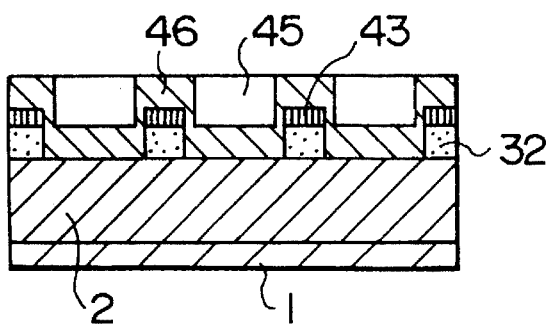

Further, as shown in FIG. 9D, without removing the photoresist 43, a metal (e.g., platinum Pt) 46 is deposited on both the surfaces of the photoresist 43 and the aperture portions 45 by the sputtering or EB vapor deposition method.

Figure 9E:
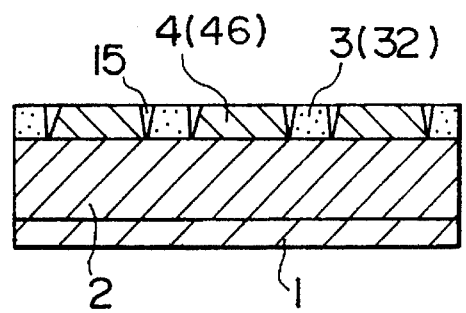

Further, as shown in FIG. 9E, by the utilization of the fact that the metal 46 formed on the side surfaces of the photoresist 43 is very thin and brittle, only the metal film 46 formed on the side surfaces of the photoresist 43 is etched by the lift-off method to remove the photoresist 43 and the metal 46 formed on the photoresist 43.

Under this step, therefore, it is possible to obtain such a state where the pixel electrode 4 (metal 46) is buried in the aperture portions 45 formed in the insulating substance layer 3 (silicon nitride layer 32), so that the pixel electrode layer 5 can be constructed in which a great number of pixel electrodes 4 are partitioned by the insulating substance layer 3.

After that, the device is annealed at about 400° to 500° C. to improve the rectifying characteristics of the pixel electrode layer 5.

Figure 9F:
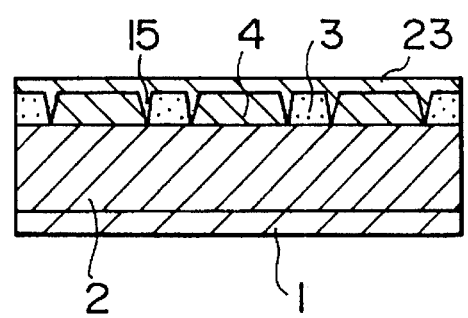

Further, as shown in FIG. 9F, a dielectric substance such as application type silicon compound (SOG: Spin On Glass) is applied onto the surface of the pixel electrode layer 5 (on which the insulating substance layer 3 and the pixel electrodes 4 are exposed) by spin coating method to form a film. After that, the formed film is annealed to form a stabilized planarize layer 21.

In the above-mentioned process of forming the planarized layer 23, since the SOG can fill the grooves 15 formed around the respective pixel electrodes 4 in the process of forming pixel electrode layer 5, the surfaces of the insulating substance layer 3 and the pixel electrodes 4 are both covered with a thin film into a planarized condition. On the surface of this planarized layer 23, since the roughness due to the grooves 15 can be eliminated, it is possible to obtain a perfect planarized surface. In addition, when the surface of the planarized layer 23 is further etched back where necessary, it is possible to further improve the planarization degree.

Figure 9G:
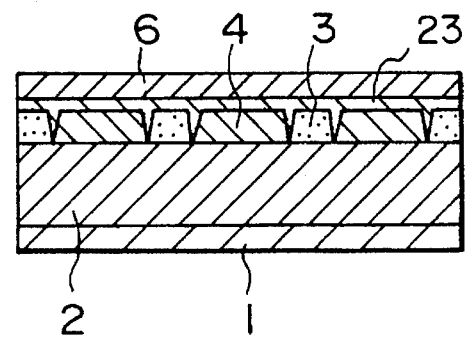

Further, as shown in FIG. 9G, a dielectric film is formed on the surface of the planarized layer 23 by plasma CVD method. After annealed, the dielectric reflection layer 6 is formed by depositing a multilayer reflection film; the liquid crystal layer 7 is sealed between the dielectric reflection layer 6 and the drive electrode layer 8 by determining the thickness thereof with a spacer 12; and the transparent insulating substrates 9 and 10 are bonded onto both the surfaces of the drive electrodes layers 1 and 8, to complete the spacial light modulation device of the present embodiment as shown in FIG. 7.

In the second embodiment as described above, since the surface of the planarized surface 23 is formed into a high flatness, the dielectric reflection layer 6 has a uniform layer thickness without surface roughness and bend or pinholes, so that an excellent reflection surface can be realized.

As described above, in the second embodiment of the present invention, since the planarized layer is additionally formed between the pixel electrode layer 5 and the dielectric reflection layer 6, even if the surface of the pixel electrode layer 5 is roughed by the lift-off method in the forming process, it is possible to form the dielectric reflection layer 6 of less defectiveness and excellent flatness. Further, the dielectric reflection layer 6 can be separated perfectly from the photoconductive layer 2.

Accordingly, it is possible to prevent the reflection factor and the contrast of the read light FC from being lowered during the manufacturing process and further to prevent the image resolution from being deteriorated effectively, thus realizing a high performance spacial light modulation device.

Further, the features of the first embodiment of the spacial light modulation device are that the respective pixel electrodes 21 are composed of the Schottky contact portions 21a and the pixel composing portions 21b and that the contact areas between the pixel composing portions 21b and the dielectric reflection layer 6 is determined larger than that between the Schottky contact portions 21a and the photoconductive layer 2.

Further, the feature of the second embodiment of the spacial light modulation device is that the planarized layer 23 is formed between the pixel electrode layer 5 and the dielectric reflection layer 6.

Therefore, it is of course possible to construct the spacial light modulation device provided with the features of both the embodiments. In this case, in FIG. 4, the planarized layer 23 as shown in FIG. 7 is to be formed between the pixel electrode layer 22 and the dielectric reflection layer 6.

Further, in order to manufacture the spacial light modulation device as described above, on the surface of the pixel composing portions 21b formed as described with reference to FIG. 6G, the planarized layer 23 and the dielectric reflection layer 6 are both formed in sequence as explained with reference to FIGS. 9F and 9G.

When the above-mentioned features of the first and second embodiments are combined with each other, it is of course possible to obtain a further higher contrast and resolution in the spacial light modulation device.

What is claimed is:

1. A spacial light modulation device in which a photoconductive layer, a pixel electrode layer, a dielectric reflection layer, and a liquid crystal layer are laminated in sequence between first and second drive electrode layers, wherein the pixel electrode layer includes a plurality of pixel electrodes partitioned by an insulating substance layer and arranged at predetermined intervals; and a surface area of each of the pixel electrodes formed on the photoconductive layer side is smaller than that formed on the dielectric reflection layer side.

2. The spacial light modulation device of claim 1, wherein a plurality of square-shaped pixel electrodes are formed in the pixel electrode layer being arranged into a matrix pattern at predetermined intervals; and each of the square-shaped pixel electrode is composed of a Schottky contact portion in contact with the photoconductive layer and a pixel composing portion in contact with the dielectric reflection layer, the contact area of the Schottky contact portion with the photoconductive layer being smaller than the contact area of the pixel composing portion with the dielectric reflection layer.

3. The spacial light modulation device of claim 1, which further comprises a dielectric planarized layer formed between the pixel electrode layer and the dielectric reflection layer to planarize a surface of the dielectric reflection layer.

4. The spacial light modulation device of claim 3, wherein the dielectric planarized layer is formed of application-type silicon compound.

5. The spacial light modulation device of claim 1, wherein the photoconductive layer is formed by an N-type silicon layer, and the first drive electrode layer is formed by an N-type resistance layer having resistance lower than that of the silicon layer.

6. A method of manufacturing a spacial light modulation device having a photoconductive layer, a pixel electrode layer, a dielectric reflection layer, and a liquid crystal layer all laminated in sequence between first and second drive electrode layers, which comprises the steps of:

forming a first silicon nitride layer on a surface of the photoconductive layer by vapor deposition;

forming a plurality of first square-shaped aperture portions each having a first one-side length on a surface of the formed first silicon nitride layer at predetermined intervals by light exposure;

forming a metal film on the surface of the first silicon nitride in which a plurality of the first square-shaped aperture portions are formed, and after planarization forming each Schottky contact portion at each of a plurality of the first square-shaped aperture portions;

forming a second silicon nitride layer on the surface of the first silicon nitride layer in which the Schottky contact portions are formed by vapor deposition;

forming a plurality of second square-shaped aperture portions each having a second one-side length longer than the first one-side length on each first square-shaped aperture portion in which the Schottky contact portion is formed, in concentric positional relationship between the first and second square-shaped portions by light exposure of the second silicon nitride layer; and forming a metal film on the second silicon nitride layer in which the second square-shaped aperture portions are formed, and after planarization forming each pixel composing portion in the second square-shaped aperture portion, to form a plurality of pixel electrodes composed of Schottky contact portions and pixel composing portions in the pixel electrode layer.

7. The method of manufacturing a spacial light modulation device of claim 6, which further comprises the steps of:

forming an application-type silicon compound film on a surface of the pixel electrode layer in which a plurality of the pixel electrodes are formed; and forming a planarized layer between the pixel electrode layer and the dielectric reflection layer by annealing the applied film.

8. A method of manufacturing a spacial light modulation device in which a photoconductive layer, a pixel electrode layer having a plurality of pixel electrodes arranged at predetermined intervals, a dielectric reflection layer, and a liquid crystal layer are laminated in sequence between first and second drive electrode layers, which comprises the steps of:

forming an application-type silicon compound film on a surface of the pixel electrode layer in which a plurality of the pixel electrodes are formed; and forming a planarized layer between the pixel electrode layer and the dielectric reflection layer by annealing the applied film.

9. The method of manufacturing a spacial light modulation device of claim 8, which comprises the steps of:

forming a first silicon nitride layer on a surface of the photoconductive layer by vapor deposition;

forming a plurality of first square-shaped aperture portions each having a first one-side length on a surface of the formed first silicon nitride layer at predetermined intervals by light exposure;

forming a metal film on the surface of the first silicon nitride in which a plurality of the first square-shaped aperture portions are formed, and after planarization forming each Schottky contact portion at each of a plurality of the first square-shaped aperture portions;

forming a second silicon nitride layer on the surface of the first silicon nitride layer in which the Schottky contact portions are formed by vapor deposition;

forming a plurality of second square-shaped aperture portions each having a second one-side length longer than the first one-side length on each first square-shaped aperture portion in which the Schottky contact portion is formed, in concentric positional relationship between the first and second square-shaped portions by light exposure of the second silicon nitride layer; and forming a metal film on the second silicon nitride layer in which the second square-shaped aperture portions are formed, and after planarization forming each pixel composing portion in the second square-shaped aperture portion, to form a plurality of pixel electrodes composed of Schottky contact portions and pixel composing portions in the pixel electrode layer.

10. A spacial light modulation device in which a photoconductive layer, a pixel electrode layer having a plurality of pixel electrodes arranged at predetermined intervals, a dielectric reflection layer and a liquid crystal layer are laminated in sequence between first and second drive electrode layers, a surface area of each of the pixel electrodes formed on the photoconductive layer side being smaller than that formed on the dielectric reflection layer side, said spacial light modulation device comprising a dielectric planarized layer formed between the pixel electrode layer and the dielectric reflection layer to planarize a surface of the dielectric reflection layer.

11. The spacial light modulation device of claim 10, wherein the dielectric planarized layer is formed of application-type silicon compound.

12. The spacial light modulation device of claim 10, wherein the photoconductive layer is formed by an N-type silicon layer, and the first drive electrode layer is formed by an N-type resistance layer having resistance lower than that of the silicon layer.

13. A spacial light modulation device in which a photoconductive layer, a pixel electrode layer having a plurality of square-shaped pixel electrodes arranged into a matrix pattern at predetermined intervals, a dielectric reflection layer and a liquid crystal layer are laminated in sequence between first and second drive electrode layers, each of the square-shaped pixel electrodes being composed of a Schottky contact portion in contact with the photoconductive layer and a pixel composing portion in contact with the dielectric reflection layer, the contact area of the Schottky contact portion with the photoconductive layer being smaller than the contact area of the pixel composing portion with the dielectric reflection layer, said spacial light modulation device comprising a dielectric planarized layer formed between the pixel electrode layer and the dielectric reflection layer to planarize a surface of the dielectric reflection layer.

14. The spacial light modulation device of claim 13, wherein the dielectric planarized layer is formed of application-type silicon compound.

15. The spacial light modulation device of claim 13, wherein the photoconductive layer is formed by an N-type silicon layer, and the first drive electrode layer is formed by an N-type resistance layer having resistance lower than that of the silicon layer.

* * * * *